March 1, 1966  D. S. GUNTER ETAL  3,237,273
METHOD OF MAKING A CAPACITOR
Filed Aug. 17, 1962  3 Sheets-Sheet 1
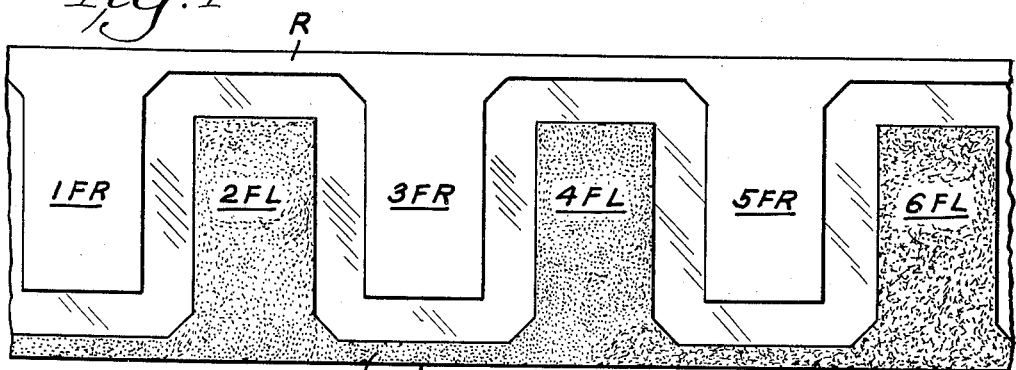
Fig. 1
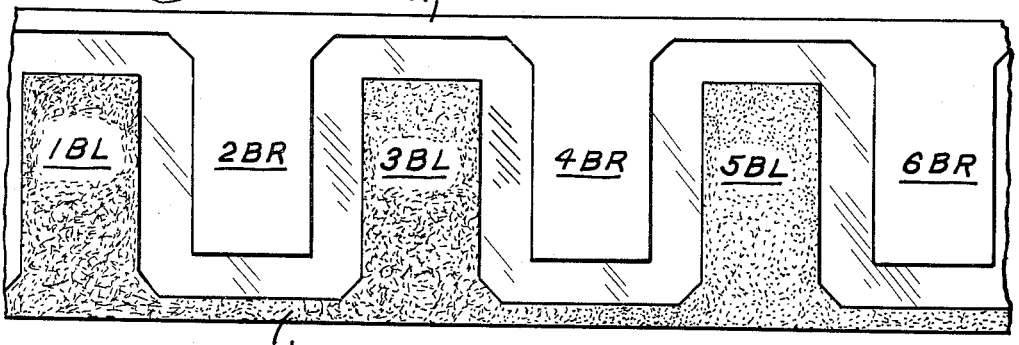
Fig. 2
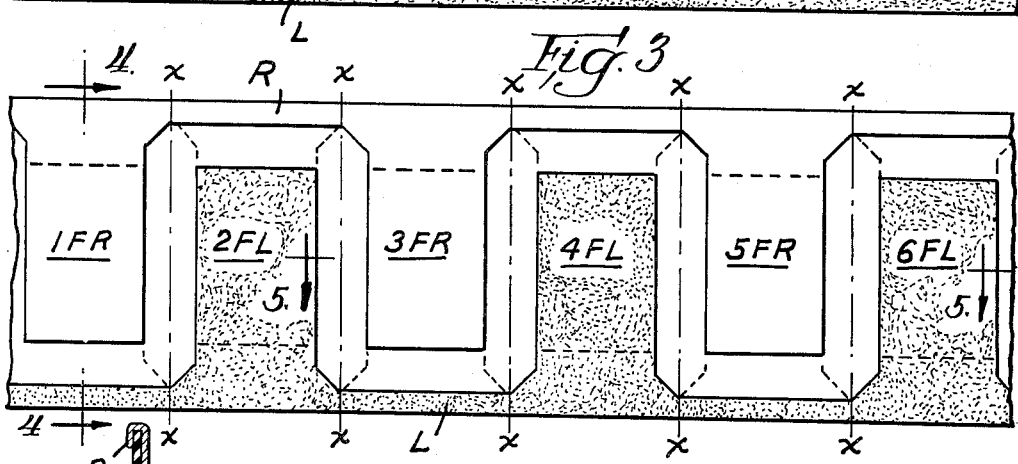
Fig. 3
Fig. 4
Fig. 5
INVENTORS
David S. Gunter and
William D. McConnell
By Brown, Jackson, Boettcher & Dienner
Attys.

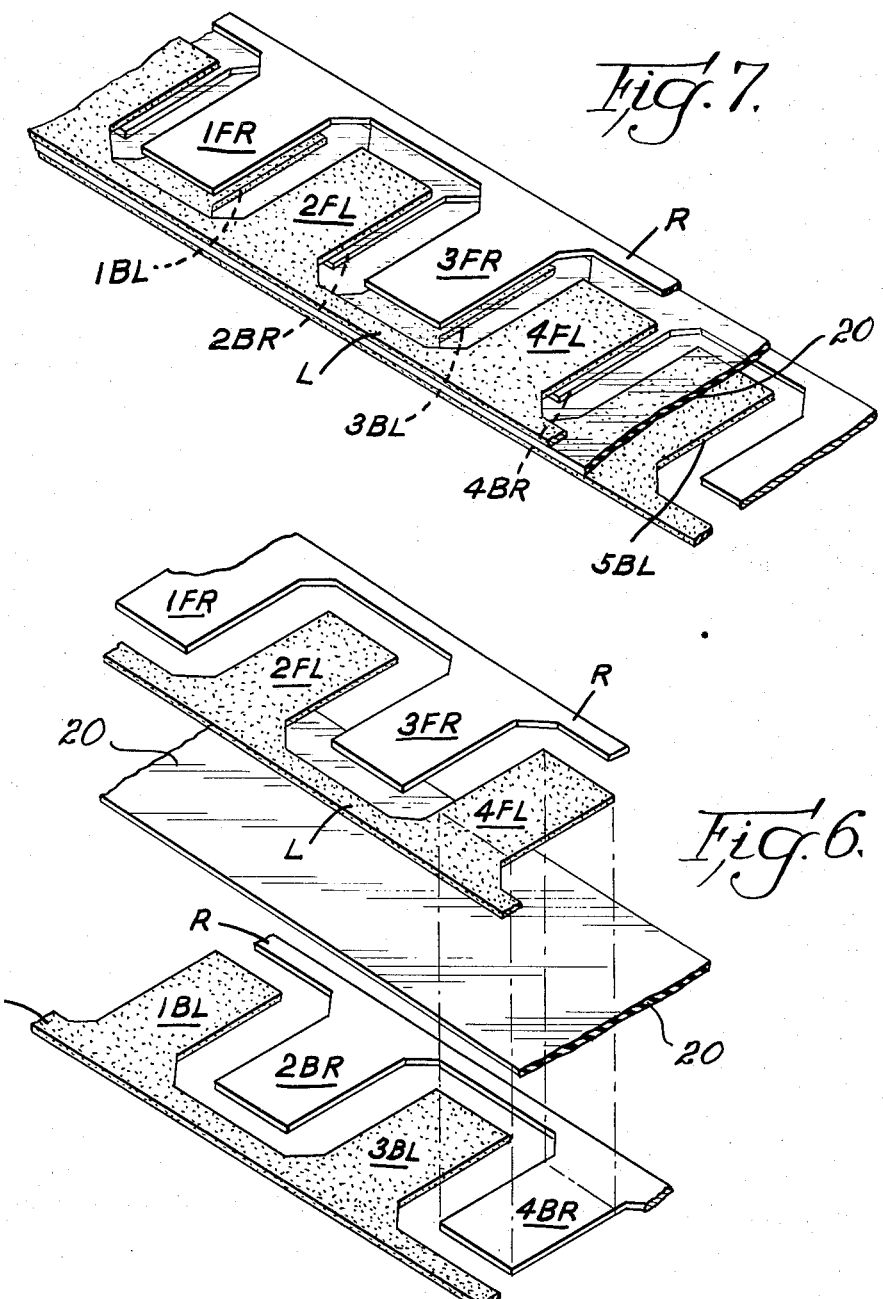

March 1, 1966
D. S. GUNTER ETAL
3,237,273
METHOD OF MAKING A CAPACITOR
Filed Aug. 17, 1962
3 Sheets-Sheet 3
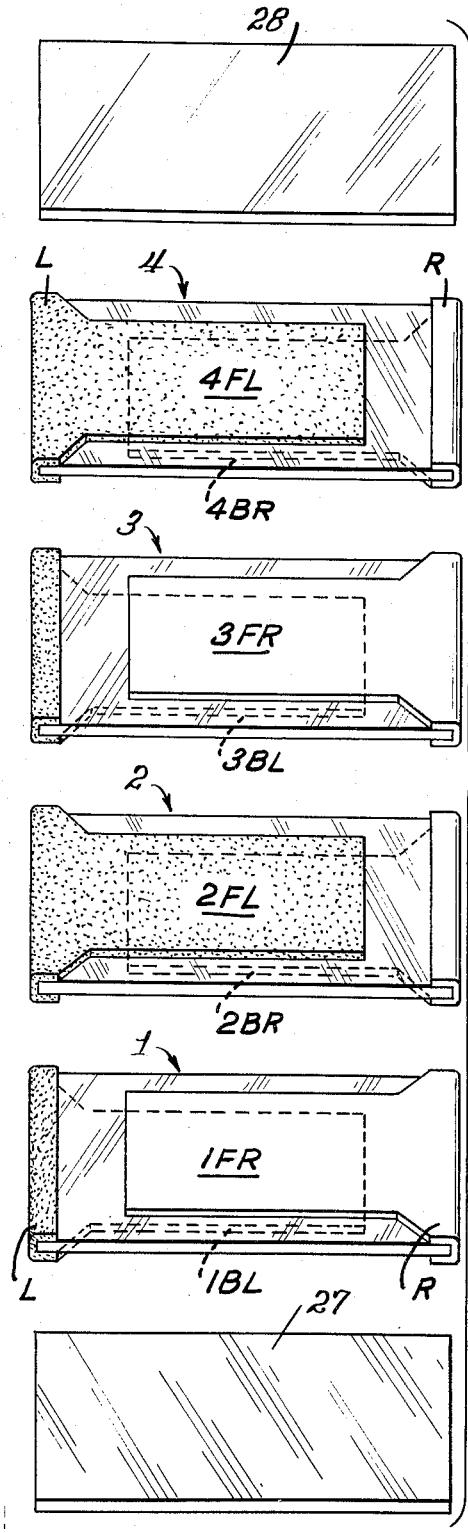
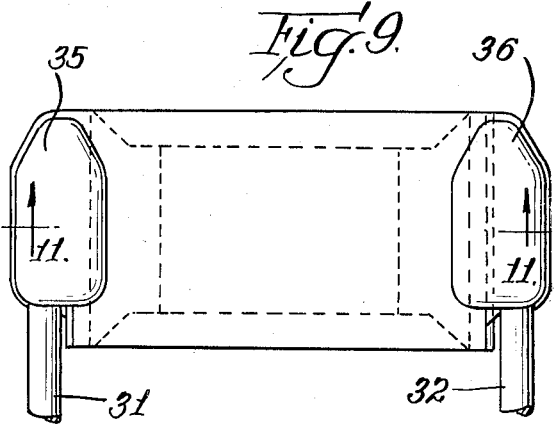
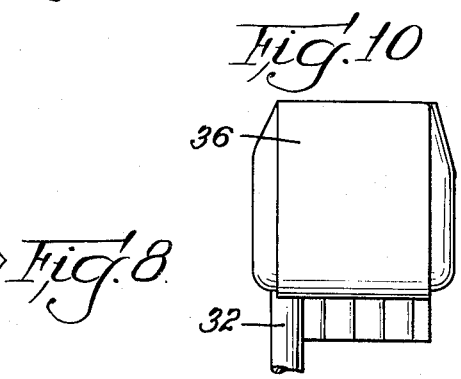
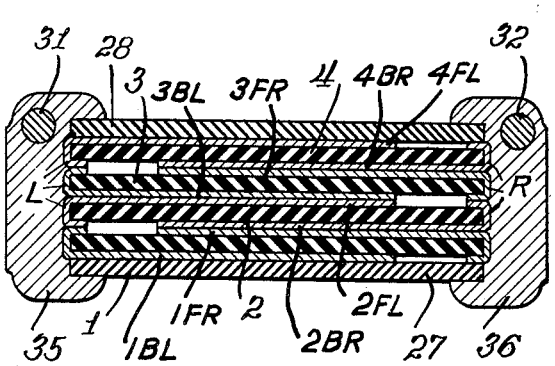
INVENTORS
David S. Gunter and
William D. McConnell
By Brown, Jackson, Boettcher & Dienner
Att'ys.

United States Patent Office 3,237,273
Patented Mar. 1, 1966

3,237,273
METHOD OF MAKING A CAPACITOR
David S. Gunter and William D. McConnell, Springfield, Ill., assignors to Sangamo Electric Company, Springfield, Ill., a corporation of Delaware
Filed Aug. 17, 1962, Ser. No. 217,688
2 Claims. (Cl. 29—25.42)

The present invention relates to method of making a capacitor.

The invention is particularly directed to the making of miniature and sub-miniature electrical capacitors, but we wish it to be understood that the invention is not limited in its utility to these extremely small capacitors. These miniature and sub-miniature capacitors present very difficult problems in the operations of assembling and electrically joining the component parts. For example, one prior difficulty has been to effect the proper stacking of the metallized dielectric plates, these generally consisting of extremely small pieces of mica on the opposite sides of which metallized patterns are formed to produce the conductive areas of each capacitor plate. The general practice of making these capacitor plates has been to take a long narrow strip of mica, or other suitable dielectric material, and to spray, paint, or otherwise apply a metallized film, usually comprising silver, to both sides of the mica strip, in the form of repeating patterns defining separate capacitor plate elements. This metallized mica strip is then sheared transversely between the repeating patterns to form the separate capacitor plates. One assembling or stacking difficulty heretofore encountered has been the necessity of turning over each alternate capacitor plate in the series of sheared plates, in order to have successive paired plates present conductive areas of the same polarity in back-to-back relation. This has generally required the physical operation of grasping or taking hold of each capacitor plate to be turned over, which can be time consuming, and likely to result in stacking errors.

One of the main objects of the present invention is to avoid this necessity of having to turn over alternate mica capacitor elements, thereby enabling the stacking operation to be performed much more readily and without the previous possibility of error. This object is attained by a new and unique relationship of the metallized patterns on the opposite sides of the mica strip.

As above remarked, difficult assembly problems also arise in these miniature capacitors with respect to electrically joining the outer terminal edges of paired capacitor plates, and connecting terminal leads thereto. For example, the practice of making these electrical connections by any form of soldering operation is generally time consuming, requires almost microscopic vision, can result in shorted conditions from an excess of solder, and are subject to other well known objections.

Another object of the invention is to avoid the foregoing difficulties of establishing these electrical connections. According to the present invention, this is accomplished by the unique step of die-casting together the metallized edges at each end of the stack, and including therewith in such die-casting operation, the lead terminal to be connected with that end of the stack.

Other objects, features and advantages of the invention will appear from the following detailed description of one preferred embodiment thereof. In the accompanying drawings illustrating such embodiment:

FIGURE 1 is a front elevational view, on a greatly enlarged scale, of the front side of the mica base strip after the metallized or silver pattern of conductive areas has been applied thereto;

FIGURE 2 is a rear elevational view of the rear or back side of this mica strip after the metallized or silver pattern of conductive areas has been applied thereto, this figure being analogous to a transparency through FIGURE 1 or a mirrored reflection of the back side of FIGURE 1;

FIGURE 3 is a view of the front side of the mica base strip, corresponding to FIGURE 1, but having the conductive areas of FIGURE 2 illustrated therein in dotted lines;

FIGURE 4 is a transverse sectional view taken approximately on the line 4—4 of FIGURE 3;

FIGURE 5 is a longitudinal sectional view taken approximately on the plane of the line 5—5 of FIGURE 3;

FIGURE 6 is a schematic perspective view in which the front and back silver patterns are diagrammatically shown as being vertically separated from the plane of the mica base strip, in order to show to better advantage the transverse relationship between the front and back capacitor plate areas;

FIGURE 7 is a further development of FIGURE 6 showing the front and back screened silver patterns and the mica base strip converged together into approximately the relationship previously illustrated in FIGURES 1–5;

FIGURE 8 illustrates in upwardly tipped or edgewise perspective views four of the complete capacitor plate units as they have been sheared by transverse cutting through the metallized mica tape along the transverse shear lines designated x—x in FIGURE 3; this FIGURE 8 also illustrating the top and bottom closure plates composed, for example, of clear mica bond;

FIGURE 9 is a front elevational view of the completed capacitor after the opposite terminal edges of the several capacitor plate assemblies have been electrically joined together by right and left die-casting operations, in which die-castings are also embedded the two lead wires for establishing terminal connection with the capacitor;

FIGURE 10 is an end or edge view of one of the die-cast terminals; and

FIGURE 11 is a transverse sectional view through the completed capacitor, taken approximately on the plane of the line 11—11 of FIGURE 9.

Considering the invention in its primary utility of making miniature and sub-miniature capacitors, it will be obvious that all of the foregoing figures in the drawings are shown enlarged to considerably magnified scales. For example, the long strip of dielectric material shown in FIGURES 1–3 may in actual practice have a width of approximately .350″ (less than ⅜″) for one representative size miniature capacitor, it being understood of course that this dielectric base strip may be of greater or lesser width as desired. Such dielectric base strip, designated 20, is preferably composed of mica, but it might also consist of other dielectric mediums, such as irrathene, samica, etc., such base strip being of a very thin pliable tape or ribbon, having a representative thickness of approximately .0015″, although, here again, this is srbject to sllbstantial variation.

In order to facilitate an understanding of the registration of the front and back plate areas on opposite sides of the mica strip, we have adapted certain arbitrary descriptive terms, which are not intended to be limitative. For example, the side of the mica strip which is shown in FIGURE 1 shall be referred to as the "front" side or surface, designated "F," and the obverse side shown in FIGURE 2 shall be referred to as the "back" or rear side, designated "B." Also, for like purposes, one of the longitudinal edges of this base strip 20 has been designated R' (to exemplify a first or "right" hand edge), and the opposite longitudinal edge has been designated L' (to exemplify a second or "left" hand edge). Referring to FIGURE 3, the transverse dash and dot lines x—x denote the shear lines across which the finished mica strip or tape 20 is sheared after the silvered patterns have been applied to both sides thereof. For the representative length of tape shown, this shearing results in six distinct capacitor elements, which have been numbered 1, 2, 3, 4, 5 and 6.

The metallized patterns applied to both sides of the dielectric base strip 20 preferably consist of a reducible metal oxide, such as silver. This is preferably applied by a silk screen process, following which the silvered patterns are fired at an appropriate temperature.

Referring first to FIGURE 1, illustrating the silk screen pattern which has been applied to the so-called front surface "F" of the mica strip 20, it will be seen that a very narrow conducting ribbon R extends longitudinally along the so-called right-hand edge of the mica strip, and a similar narrow conducting ribbon L extends along the so-called left-hand edge of the mica strip, these two edge ribbons R and L constituting the terminal ends of each capacitor element receiving the opposite polarities impressed on the capacitor.

Projecting inwardly from the right-hand conducting ribbon R is a series of conducting tongues or plate areas 1FR–3FR–5FR, etc. Referring now to the left-hand conducting edge ribbon L, there is a like series of conducting tongues or plate areas designated 2FL–4FL–6FL, etc. It will be noted that the tongues or plate areas of both the right and left hand series are spaced apart by spaces S of identical width, with the tongues or plate areas of the opposite series extending into such spaces, so that the right and left hand tongues alternate progressively along the length of the tape. The significance of the designations 1FR–3FR–5FR indicates that these alternate tongues 1–3–5 are all on the "F" or front side of the tape, and are all connected with the "R" or right-hand edge ribbon R. Similarly, the significance of the designations 2FL–4FL–6FL indicates that the other alternate tongues 2–4–6 are all likewise on the "F" or front side of the mica tape, but in this instance each of these tongues, 2–4–6, is connected with the "L" or opposite left-hand edge ribbon L.

Referring now to FIGURE 2 which shows the silk screened silver pattern applied to the so-called back surface "B" of the tape, this surface likewise has a narrow conducting ribbon R extending along the so-called right-hand edge of the mica tape or strip, and also has a narrow conducting ribbon L extending along the so-called left-hand edge of the mica strip. The two conducting ribbons R and R on opposite sides of the mica strip are preferably in electrical conductivity with each other so as to be in effect a single ribbon, and this also applies to the two conducting ribbons L and L on opposite sides of the other edge of the mica strip. Projecting inwardly from the right-hand conducting ribbon R are the spaced conducting tongues or plate areas 2BR–4BR–6BR; and projecting inwardly from the left-hand conducting ribbon L are the interposed conducting tongues or plate areas 1BL–3BL–5BL, etc. In each of the figures, the second or left-hand conducting edge ribbons L, L and their associated tongue areas 2FL–4FL–6FL and 1BL–3BL–5BL, etc., have all been shown stippled to distinguish more easily from the other ribbon edges and tongue areas. These latter tongues or plate areas 1BL–3BL–5BL on the back side B are of the same shape and area as those on the front side F, and their side perimeters are in transverse alignment therewith through the mica strip. However, each transversely aligned pair tongues are reversely connected to the opposite marginal ribbons R and L, this relationship being clearly shown in FIGURES 1, 2, 6, and 7. For example, the plate area of the tongue 1FR on the front side F connecting with the right-hand ribbon R (shown in FIGURE 1) is in transverse registration with the plate area of the tongue 1BL on the back side B connecting with the left-hand ribbon L (as shown in FIGURE 2). Thus, these two tongue areas, each denoted by the numeral 1, constitute the two dielectrically spaced conducting plates of a capacitor unit assembly 1—1.

The same also applies to the other successive pairs of plate areas 2—2, 3—3, 4—4, etc., except that their connections with the marginal ribbons R and L alternate. For example, the next plate or tongue area 2FL on the front side (FIGURE 1) differs from the adjacent plate area 1FR on that same side in being connected with the left-hand ribbon L instead of the right-hand ribbon R. Correspondingly, the transversely opposite tongue area 2BR on the back side (FIGURE 2) differs from the adjacent tongue area 1BL in being connected with the right-hand ribbon R instead of the left-hand ribbon L. Thus, here again, the two tongue areas each denoted by the numerals 2—2 constitute two dielectrically spaced conducting plates of a capacitor unit assembly. The same relationship continues on through the other pairs of plate areas 3—3, 4—4, 5—5, etc.

Generally, the mica strips 20 will all be of the same length, having the same number of capacitor units 1—1, 2—2, 3—3, etc., along each length, and where a high degree of accuracy of the rated capacitance is desired, it may be desirable to make testing measurements of the capacitance of each of these mica strips; followed by the sorting of the separate strips into corresponding groups of substantially the same discreet capacitance ranges. The strips are then placed in magazines, along with the end dielectric closure plates 27 and 28 for the opposite ends or sides of each finished capacitor, these closure plates 27 and 28 being preferably composed of mica bond or any other appropriate dielectric material (FIGURE 8). Also loaded into each magazine are small plastic retaining clips which are used to hold stacked mica units or plates 1—1, 2—2, etc., from the time of cutting to the time of die-casting the ends of the plate units together. These loaded magazines are set into an automatic cutting and stacking machine, which is set to cut a predetermined number of silvered mica plates. The cutting and stacking machine then automatically performs the following operations:

(a) It places a single piece of clear mica bond 27 or 28 into the receiving nest;

(b) It cuts and stacks a preset number of individual silvered mica plates into the same nest;

(c) It places the second piece of clear mica bond 27 or 28 into the nest over the last piece of silvered mica;

(d) It inserts and places a retaining clip on to the stack of mica; and (e) It ejects the clipped stack of mica on to a tote pan or other type of conveying apparatus.

It is important to point out in connection with the above description of the operation of cutting and stacking, that after the operation of cutting along the shear lines x—x, preliminary to stacking, there is no necessity of having to invert any of the sheared units, or turning any of these units end for end. This will be clearly apparent from the stacking relation shown in FIGURES 8 and 10. For example, let us assume that the mica units are to be stacked upwardly in numerical sequence with unit 1 at the bottom of the stack, unit 2 placed on top of unit 1, unit 3 placed on top of unit 2, and unit 4 placed on top of unit 3, with the upper faces of all units facing upwardly. As best shown in FIGURE 11, it will be seen that the front plate area 1FR of unit 1 contacts the back plate area 2BR of unit 2; that the front plate area 2FL of unit 2 contacts the back plate area 3BL of unit 3; and that the front plate area 3FR of unit 3 contacts the back plate area 4BR of unit 4. Accordingly, it will be seen that the stack of mica units 1, 2, 3, and 4 is complete with the conductive plate areas in proper electrical contact and with the dielectrics properly interposed therebetween; it being understood that this representative stack can be increased or decreased to have any desired number of mica plate units. The above stacking operation, without the necessity of inverting any of the units or of turning any of the units end for end, is a big factor in the handling of these units either in manual assembling operations or automatic assembling operations; this being largely by reason of the extremely small size of the units which makes it difficult to turn alternate units over and get them assembled with accuracy.

Referring now to the next method steps which follow the previously described steps of ejecting each clipped stack of mica pieces 1, 2, 3, 4, etc., into the tote pan or on to any suitable conveyor, such tote pan or conveyor then conveys each of the clipped stacks to a die-casting machine which forms a die-cast connector over each of the ribbon edges R and L. The die-casting metal employed in this die-casting operation may be composed of different ingredients in varying proportions, but we preferably compose the metal of approximately 88% tin, 8% bismuth, and 4% copper, this die-casting metal being preferably maintained at a temperature of approximately 900° F.

Immediately adjacent to the die-casting machine is lead wire mechanism having spools from which lead wires 31 and 32 are fed either automatically or manually for anchorage in the opposite die-cast terminal connector blocks or lugs, designated 35 and 36. As the clipped mica stacks arrive at the die-casting machine, they are inserted either manually or automatically into a cavity or cavities of the die-casting machine, following which the lead wires 31 and 32 are positioned at each end of the mica stack. The cavity apparatus preferably consists of two casting openings or cavities for forming the two opposite die-cast terminals simultaneously; but, if desired, the cavity apparatus may have only a single cavity opening for forming the two opposite die-cast terminals in separate casting operations. In either event, when the cavity apparatus closes the die-casting metal is shot under pressure into each end of the die cavity for electrically joining the marginal conductive ribbons R and L together at opposite sides of the capacitor assembly; and for also anchoring the lead wires 31 and 32 in these die-cast terminals. Following the casting operation, the cavity apparatus opens and the finished mica capacitor section is ejected.

Thereafter, the capacitor sections are preferably completely sealed against moisture, outside gases, etc. Preferably the capacitor sections are impregnated with an insulating material, typically represented by wax, epoxy, polyester, silicone, etc. The impregnated capacitor sections may then be encased in an insulating moisture resistant package which may be applied by compression molding, transfer molding, dipping, encapsulation, or potting in a plastic case. The encasing material may be epoxy, polyester, silicone, or other suitable material. The capacitors are then visually inspected and electrically tested, marked, etc., for ultimate use.

While we have illustrated and described what we regard to be the preferred embodiment of our invention, and the preferred manner of carrying the method into effect, nevertheless, it will be understood that such are merely exemplary, and that numerous modifications and rearrangements may be made therein without departing from the essence of the invention.

We claim:

1. The method of producing electrical capacitors which comprises, forming directly upon opposite faces of a dielectric strip two series of metallic plate elements disposed transversely of the strip with the elements of one series extending between and uniformly spaced from those of the other series and the elements of each series connected by a metallic conducting ribbon mounted directly upon and extending along and about the side edge of the strip and spaced from the elements of the other series and with the elements at each face of the strip overlying the elements at the opposite face of the strip, severing the strip transversely midway between the overlying pairs of plate elements to provide unts respectively comprising a dielectric element having plate elements at the opposite faces thereof respectively attached to conducting elements at opposite edges of said dielectric element, and securing the severed units in a stack with the units of the stack similarly disposed and with the plate elements and conducting elements at opposed faces of said dielectric elements seating directly one upon the other and the conducting elements at opposite sides of the stack providing conductive connection between the corresponding plate elements.

2. The method of producing electrical capacitors which comprises, forming a plurality of units respectively comprising a dielectric element and plate elements at opposite faces thereof respecively attached to conductor elements directly mounted on the dielectric element at the side edges thereof, arranging said units in a stack with the units of the stack similarly disposed and with the plate elements and conductor elements at opposed faces of said dielectric elements seating directly one upon the other, and securing the stacked units together by means providing electrical connection between the conductor elements at the respective sides of the stack.

References Cited by the Examiner

UNITED STATES PATENTS

| 2,802,256 | 8/1957 | Dauner | 29—25.42 |
| 2,875,387 | 2/1959 | Randels | 317—261 |
| 2,958,023 | 10/1960 | Edwards | 317—261 |
| 2,972,180 | 2/1961 | Gulton et al. | 29—25.42 |
| 2,978,789 | 4/1961 | Randels | 29—25.42 |
| 3,028,656 | 4/1962 | Herbert | 29—25.42 |

RICHARD H. EANES, JR., *Primary Examiner.*

JOHN P. WILDMAN, *Examiner.*